United States Patent [19]

Ziegelhoffer

[11] Patent Number: 4,820,254
[45] Date of Patent: Apr. 11, 1989

[54] CLAMP FOR BAG PRODUCING MACHINE

[75] Inventor: Paul Ziegelhoffer, Green Bay, Wis.

[73] Assignee: Paper Converting Machine Company, Green Bay, Wis.

[21] Appl. No.: 172,189

[22] Filed: Mar. 23, 1988

[51] Int. Cl.$^4$ ............................................. B32B 1/64
[52] U.S. Cl. .................................. 493/194; 156/515;
493/199; 493/205; 493/208
[58] Field of Search ............. 493/203, 205, 206, 208, 493/194, 199, 197, 202, 207, 209; 156/515, 583.1

[56] References Cited

U.S. PATENT DOCUMENTS 3,107,585 10/1963 Nystrand.
3,640,050 2/1972 Nystrand et al.
3,779,838 12/1973 Wech ................................ 156/583.1
4,048,003 9/1977 Bolli ..................................... 493/203
4,063,983 12/1977 Shiverdecker ...................... 493/203
4,244,772 1/1981 Achelpohl ........................... 156/515
4,609,367 9/1986 Savich et al. ....................... 493/194
4,629,524 12/1986 Ausnit ................................. 156/66
4,632,667 12/1986 McDonald et al. ................ 493/187

Primary Examiner—Frederick R. Schmidt
Assistant Examiner—Robert Showalter
Attorney, Agent, or Firm—Tilton, Fallon, Lungmus & Chestnut

[57] ABSTRACT

In a bag making machine utilizing clamp bar assemblies in combination with a sealing drum, the improved clamp bar assembly wherein the clamp bar is related to the conventional pivot shaft by means of a pivot pin floating in a slightly oversized hole.

6 Claims, 2 Drawing Sheets

CLAMP FOR BAG PRODUCING MACHINE

BACKGROUND AND SUMMARY OF INVENTION

This invention relates to a clamp for a bag sealing machine and, more particularly, to a clamp which is uniquely mounted for cooperation with a sealing drum in developing a stream of plastic bags. Illustrative of the type of bag making machine with which this invention is concerned is my earlier U.S. Pat. No. 4,609,367. This utilized clamp bar assemblies to hold the polyethylene web against the sealing drum during the cutoff and cooling process. The cutoff process created the side seal of the individual bag. More particularly, the clamp bar assembly held the polyethylene web firmly to the sealing drum to prevent slippage during cutoff. The clamp bars themselves held the polyethylene on the leading and trailing edges of consecutive segments of the polyethylene web. A cutoff and sealing wire was moved on a path that allowed it to pass between the leading and trailing edges of the polyethylene web and clamps—to create the individual bags. Exemplary of the type of bag made on such machinery was the well-known reclosable bag which employed fastener strips of an interlocking nature.

The prior art machines, and those today, for that matter, generally run two-wide. In such machines, the clamp bar assembly consists of four clamping surfaces. Each clamping surface was allowed to pivot radially to align itself with the sealing drum surface. However, there was no provision for axially aligning the clamp bar. Since the clamp bars needed to clamp evenly across the entire clamping surface, considerable time was spent manually adjusting the axial alignment of the clamps. This procedure was labor intensive and required machine adjustments using feeler gauges and the loosening positioning and tightening of the clamp support bracket of each clamping surface. This was labor intensive in that it normally required shimming and adjusting numerous times the various clamp bars. The duration of this problem can be appreciated from the fact that it existed as early as the time of my earlier U.S. Pat. No. 3,640,050 which had to do with the portion of the machine employed for boxing the bags.

According to the invention herein, the problem has been solved by the seemingly simple expedient of doing away with the bolts that secure rigidly the clamp bars to the pivot shafts and instead providing a pivot pin connection therebetween with a slight amount of clearance between the pivot pin on one member and the pin receiving opening on the other member. This has resulted in a self-adjusting characteristic which is forgiving of the heretofore difficult tolerances.

Other objects and advantages of the invention may be seen in the details of the ensuing specification.

The invention is described in conjunction with an illustrative in the accompanying drawing, in which—

FIG. 1 is a fragmentary perspective view of a bag making machine embodying the inventive clamping bars;

FIG. 2 a top plan view of one clamping bar assembly which embodies four clamp bars for the above referred to "two-wide" operation;

FIG. 3 is a perspective view partially broken away as would be seen along the sight line 3—3 of FIG. 2; and FIG. 4 is a fragmentary perspective view partially broken away such as would be seen along the sight line 4—4 of FIG. 2.

DETAILED DESCRIPTION

Figure 1:
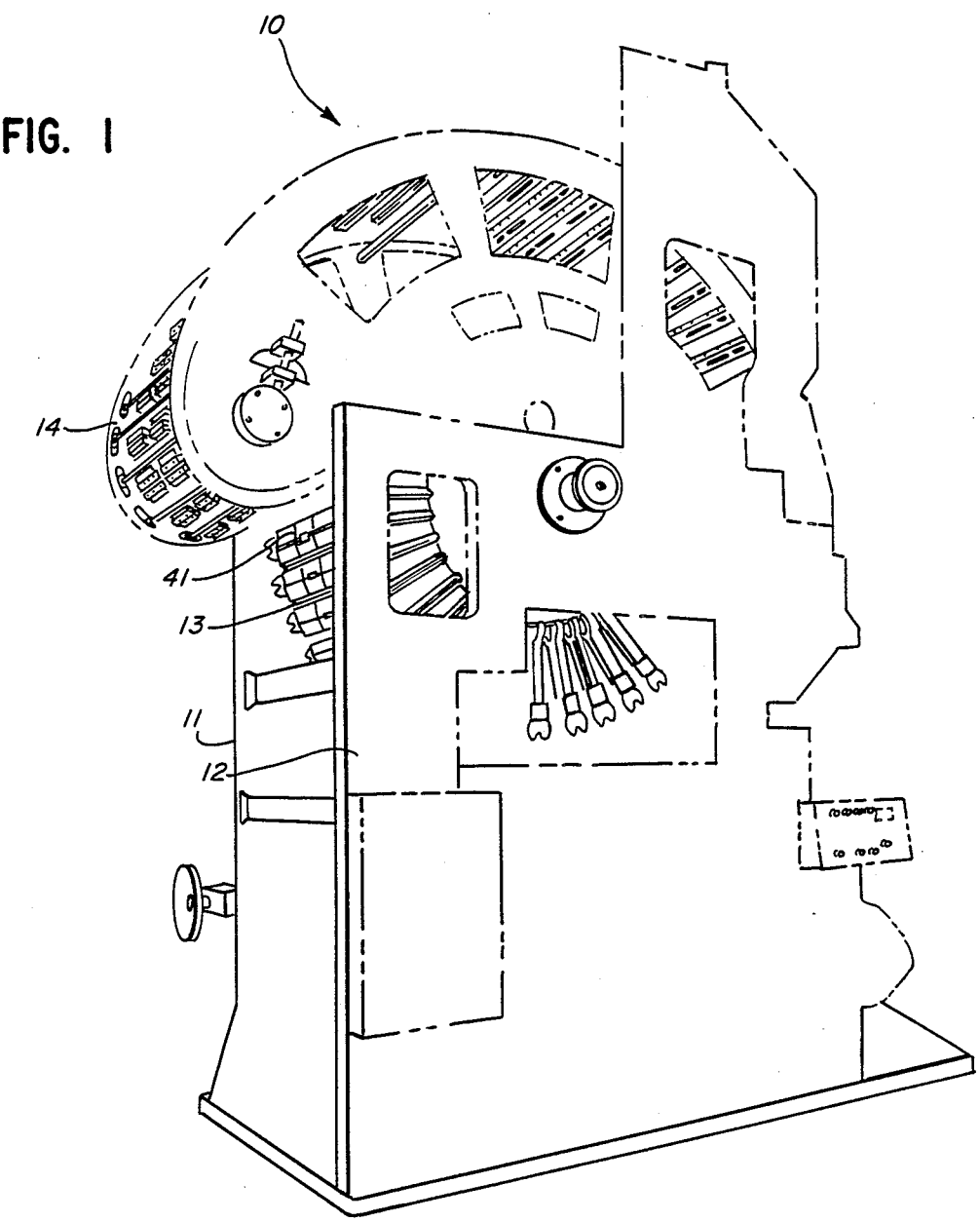

As indicated previously, the bag making art is well established—such bags being used to receive sandwiches, vegetables, etc. Historically, the machine depicted at 10 in FIG. 1 includes a pair of side frames 11 and 12, a sealing drum 13 mounted for rotation therein and a "banana" cam arrangement 14 which carries a plurality of clamp bar assemblies 15 (see FIG. 2) which coact with the sealing drum to immobilize the polyethylene web during the sealing and cutoff operation. It will be appreciated that as the sealing wire (not shown) moves into the space 16 between leading and trailing clamp bars, the heat from the wire not only transversely severs the continuous web but also provides a side seal on the trailing edge of the leading bag and another on the leading edge of the web portion to become the trailing bag. Inasmuch as the web has been transversely folded before reaching the sealing drum, this results in a bag closed along three sides with the fourth side providing the mouth.

Figure 2:
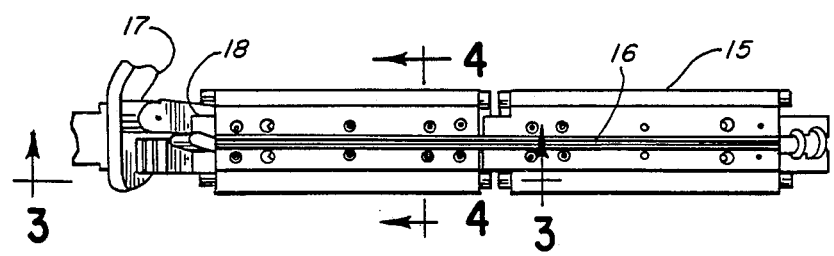

Except for certain details of the clamp bar mounting, the showings in FIGS. 1 and 2 are characteristic of the prior art. For example, it is conventional to provide chain loops such as is seen fragmentizes at 17 in the left hand portion of FIG. 2 and to provide the clamp bar assembly with an arm portion as at 18 connected to the chain loop for cooperative movement therewith.

Figure 3:
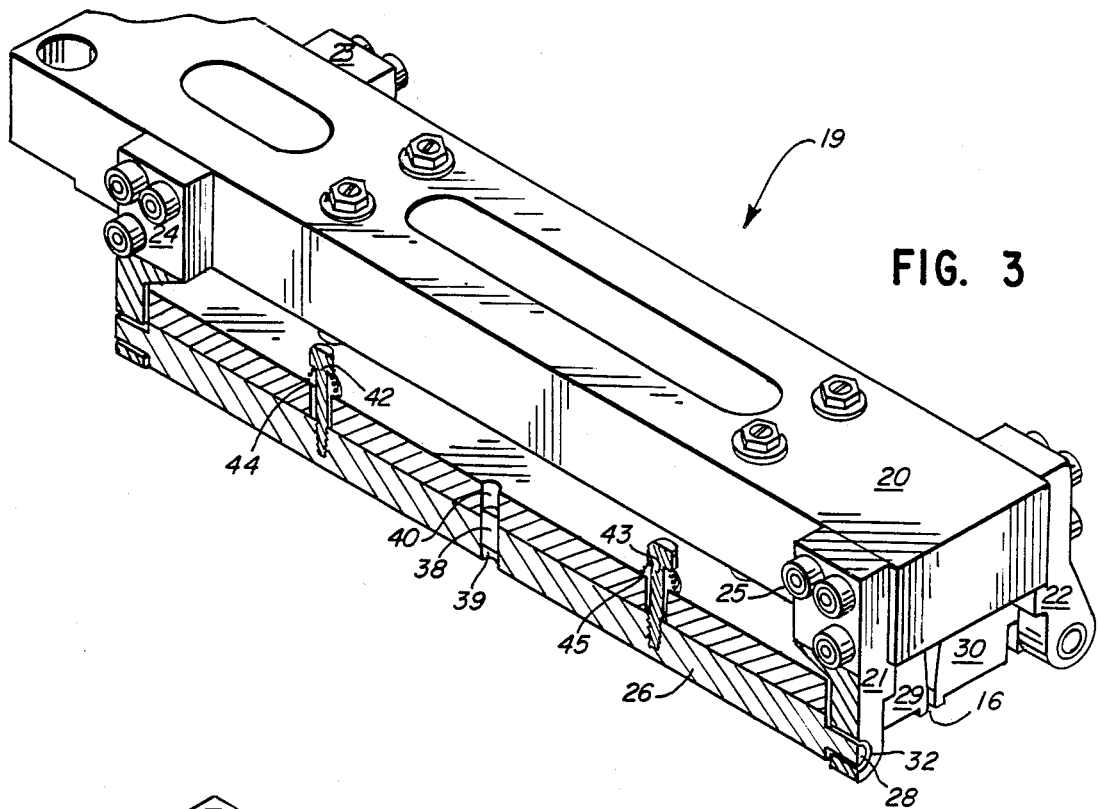
Figure 4:
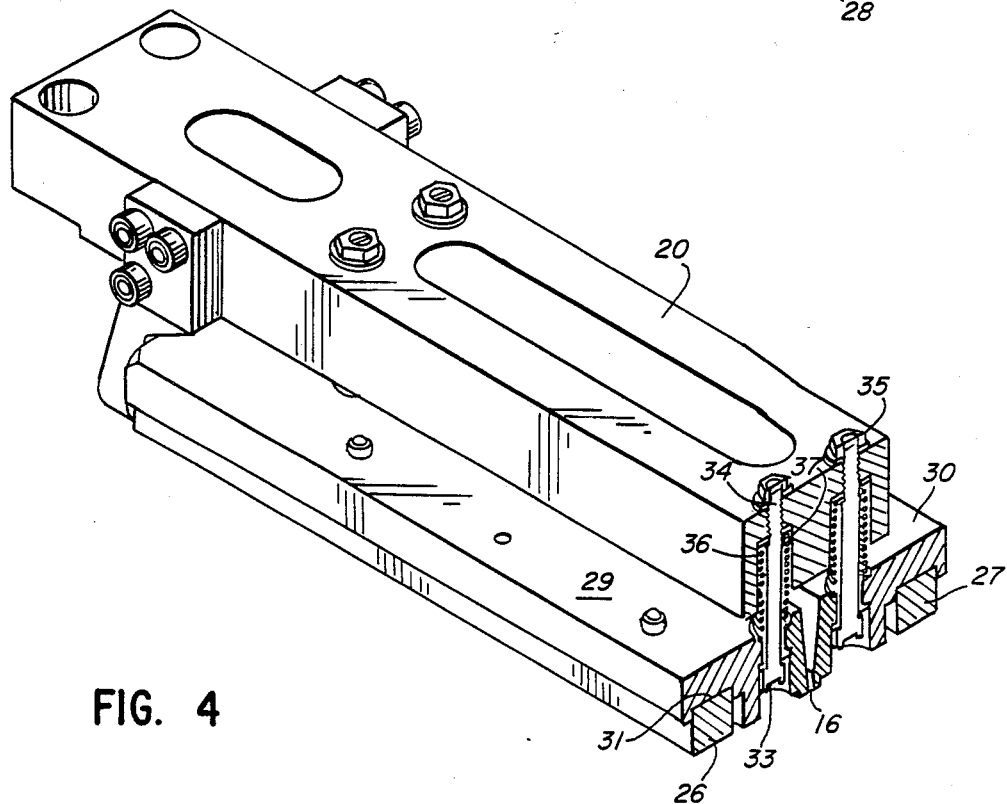

Reference is now made to the second drawing sheet featuring FIGS. 3 and 4.

As indicated previously, it is conventional practice to provide a "two-wide" machine, i.e., one servicing two folded polyethylene webs so as to develop two streams of bags. Each stream is provided by a series of clamp bar assemblies generally designated 19 in FIG. 3. This is, in effect, one half of the showing of the overall clamp bar assembly 15 of FIG. 2. Each assembly includes a clamp mounting bar 20 which is the portion equipped with the arms 17 of FIG. 2. Fastened to the bar 20 are four pivot brackets 21, 22, 23 and 24 which are arranged in two axially spaced pairs, viz., 21 and 22 at the right end of FIG. 3 and 23 and 24 at the left end. Thus, the brackets in each pair are aligned on opposite sides of the clamp mounting bar 20 and the bracket of one pair is axially aligned with the bracket of the other pair, viz., 24 is aligned with 21 and 23 is aligned with 22. The pivot brackets 21–24 are suitably secured to the clamp mounting bar 20 as by bolts 25.

The brackets 21 and 24 (being on the near side of the clamp mounting bar as seen in FIG. 3) support a pivot shaft 26 while the brackets 22 and 23 support a second pivot shaft 27. The ends of each pivot shaft are equipped with cylindrical stub ends as at 28 for rotatable movement within the associated brackets.

Each pivot shaft is equipped with a clamp as at 29 (see FIG. 4) relative to the pivot shaft 26 and 30 relative to the pivot shaft 27. It will be noted that the pivot shafts and clamps are complimentarily contoured—see for example the portion designated 31 in the lower right hand portion of FIG. 4. This provides a snug fit so that the clamp 29 or 30, as the case may be, rotates with the associated pivot shaft 26 or 27 which has its ends as at 28 mounted within bronze bushings 32—see the right hand portion of FIG. 3.

Additionally, the clamp members or bars 29 and 30 are resiliently supported each by a pair of spring loaded adjusting screws. As can be seen best in the right hand portion of FIG. 4, the clamp 29 has an opening 33 through which an adjusting screw 34 passes. The upper end of the adjusting screw extends through and above the clamp mounting bar 20 and is secured in position by a nut 35 cooperating with the screw head. The passageway through the clamp mounting bar 20 is enlarged as at 36 to accommodate a coiled spring 37. The spring loading of the clamp bars 29 and 30 to the clamp mounting bar 20 is conventional but what is different according to the invention is the connection between the pivot shafts 26, 27 and the clamps 29, 30.

In the past it had been the practice to use three bolts to connect each clamp to its associated pivot shaft. Now, however, I have eliminated those bolts and instead have provided a pivot pin 38 (see the central lower portion of FIG. 3) for this connection. The pivot shaft 26, for example, has the pivot pin 38 press-fit into an opening 39 located midway of the length of the pivot shaft 26. The clamp 29 is positioned on the pivot shaft 26 through an opening 40 which is slightly oversized. Excellent results have been obtained where the size is such as to permit the clamp bars 29, 30 a movement of the order of about 0.030" relative to the associated pivot shaft 26, 27.

What this does is to permit a very slight axial pivoting of the clamp bar so as to accommodate itself to irregularities in the sealing drum surface. Although such deviations were minor, they required the labor intensive activity previously referred to—particularly when it is considered that the clamp sealing assemblies might number up to 30 to 40 assemblies, each with four clamping bars 29, 30. And this had to be done either in a confined area or by removal with trial and error accompanied by the use of feeler gauges. So an outstanding advantage of the invention is that the clamp bars have a self-alignment feature without needing on-machine adjustments. Further, there is less maintenance because there is no need to reset clearances from time-to-time. The forgiving design of the self aligning feature provides for higher production capabilities. This is particularly advantageous in machines for producing reclosable bags where the interlocking feature has to be accommodated—see, for example, the grooves 41 in the central left hand portion of FIG. 1.

To further assure that the clamps rotate with the associated pivot shafts, the assembly 19 includes safety bolts for each clamp. As shown in FIG. 3, bolts 42 and 43 co-operate with springs 44 and 45, respectively, to maintain the snug fit between clamp 29 and shaft 26. Threaded bores in the shaft 26 receive the bolts 42 and 43. The bolts are threadedly secured to the shaft 26, and they extend through enlarged openings in the clamp 29. These openings have a diameter sufficient to prevent contact between the bolts and the clamp 29. Each of the springs 44 and 45 lie disposed between the head of the corresponding bolt and the top surface of the clamp 29. There, they provide the force to bias the clamp 29 against the shaft 26. Clamp 30 has a similar set of bolts.

While in the foregoing specification a detailed description of an embodiment of the invention has been set down for the purpose of explanation, many variations in the details hereingiven may be made by those skilled in the art without departing from the spirit and scope of the invention.

What is claimed is:

1. In a machine for producing a stream of plastic bags including a frame, a drum mounted on said frame for rotation about a predetermined axis and a pair of parallel chain loops one on each side of said drum carrying cross clamping and cutoff sealing wire means to develop individual bags from a continuous, folded plastic web, an improved clamp mechanism comprising:
    a relatively axially elongated clamp mounting bar extending generally between said chain loops having an arm portion at each end connected to said chain loops,
    a pair of clamp members resiliently coupled to said clamp mounting bar and positioned on the radially inward side different radial attitudes relative to said drum,
    two pairs of axially-spaced apart pivot brackets fixed to said clamp mounting bar and extending radially inwardly therefrom, the brackets in each pair being aligned on opposite sides of said clamp mounting bar and a bracket of one pair being axially aligned with a bracket of the other pair,
    a pivot shaft on each side of said clamp mounting bar pivotally mounted in said axially aligned brackets,
    a generally radially extending pivot pin fixed on each pivot shaft and
    an opening in each clamp member receiving a portion of said pivot pin, said opening being slightly oversized relative to said pivot pin to permit said clamp members to assume different axial attitudes relative to said clamp maintaining bar.

2. The machine of claim 1 in which the oversize is of the order of about 0.030".

3. In a machine for producing a stream of plastic bags including a frame, a drum mounted on said frame for rotation about a predetermined axis, and a pair of parallel chain loops one on each side of said drum carrying cross clamping means and cutoff sealing wire means associated with said drum to develop individual bags from a continuous, folded plastic web having tongue and groove relockable closures, an improved clamp mechanism comprising:
    a relatively axially elongated clamp mounting bar extending generally between said chain loops having an arm portion at each end connected to said chain loops,
    a pair of clamp members resiliently coupled to said clamp mounting bar and positioned on the radially inward side thereof whereby said clamp members are adapted to assume different radial attitudes relative to said rum,
    two pairs of axially-spaced apart pivot brackets fixed to said clamp mounting bar and extending radially inwardly therefrom, the brackets in each pair being aligned on opposite sides of said clamp mounting bar and a bracket of one pair being axially aligned with a bracket of the other pair,
    a pivot shaft on each side of said clamp mounting bar pivotally mounted in said axially aligned brackets,
    a generally radially extending pivot pin fixed on each pivot shaft and
    an opening in each clamp member receiving a portion of said pivot pin, said opening being slightly oversized relative to said pivot pin to permit said clamp members to assume different axial attitude relative to said clamp.

4. The machine of claim 3 in which each clamp member is resiliently coupled to its associated pivot shaft.

5. A clamp assembly for a bag making machine comprising a relatively elongated clamp mounting bar, a pair of transversely spaced pivot shafts pivotally connected to one side of said clamp mounting bar for pivotal movement in a transverse direction, a clamp member resiliently, floatingly mounted on each pivot shaft adjacent said one side of said clamp mounting bar and also coupled to said clamp mounting bar, each of said clamp members being generally L-shaped in cross-section with one leg of the L-shape conformingly contoured to said pivot shaft and with the other leg extending away from said clamp mounting bar one side, said coupling of each clamp member to said clamp mounting bar includes spring-loaded bolt means.

6. A clamp assembly for a bag making machine comprising a relatively elongated clamp mounting bar having a generally rectangular cross-section providing one elongated face adapted to confront a bag material-carrying sealing drum, pivot bracket means on said clamp mounting bar spaced longitudinally and transversely thereof, an elongated pivot shaft on each side of said clamp mounting bar mounted in said pivot bracket means, a relatively elongated clamp member pivotally, floatingly coupled to each pivot shaft and to said clamp mounting bar adjacent said one face thereof, the coupling of said clamp member to said pivot shaft including a pin fixed to said pivot shaft and a slightly oversized hole in said clamp member in which said pin is received.

* * * * *